(12) United States Patent
Greene et al.

(10) Patent No.: US 7,286,488 B1
(45) Date of Patent: Oct. 23, 2007

(54) MULTIMEDIA COMMUNICATIONS IN A TELECOMMUNICATIONS NETWORK

(75) Inventors: Nancy M Greene, Outremont (CA); Simon D Brueckheimer, London (GB); Vahe Balabanian, Nepean (CA)

(73) Assignee: Nortel Networks, Limited, St. Laurent, Quebec (CA)

( * ) Notice: Subject to any disclaimer, the term of this patent is extended or adjusted under 35 U.S.C. 154(b) by 0 days.

(21) Appl. No.: 09/445,917

(22) PCT Filed: Jun. 12, 1998

(86) PCT No.: PCT/GB98/01721

§ 371 (c)(1),
(2), (4) Date: Jul. 17, 2000

(87) PCT Pub. No.: WO98/58517

PCT Pub. Date: Dec. 23, 1998

(30) Foreign Application Priority Data

Jun. 14, 1997 (GB) .................................. 9712340.0

(51) Int. Cl.
*H04L 12/28* (2006.01)
*H04L 12/56* (2006.01)
*H04L 12/66* (2006.01)
*H04M 1/64* (2006.01)
*H04M 11/00* (2006.01)
*G06F 15/16* (2006.01)
*H04N 7/173* (2006.01)

(52) U.S. Cl. .................... 370/254; 370/352; 370/395.5; 370/401; 370/409; 379/88.17; 379/93.07; 709/203; 709/220; 709/249; 725/98; 725/119

(58) Field of Classification Search ................ 370/254, 370/352, 395.5, 401, 409; 379/88.17, 93.07; 709/203, 220, 249; 725/98, 118
See application file for complete search history.

(56) References Cited

U.S. PATENT DOCUMENTS

| 5,579,308 | A | * | 11/1996 | Humpleman | 370/352 |
| 5,633,868 | A | * | 5/1997 | Baldwin et al. | 370/331 |
| 5,692,126 | A | * | 11/1997 | Templeton et al. | 709/249 |
| 5,991,292 | A | * | 11/1999 | Focsaneanu et al. | 370/352 |
| 6,091,732 | A | * | 7/2000 | Alexander et al. | 370/401 |
| 6,104,870 | A | * | 8/2000 | Frick et al. | 703/27 |
| 6,185,288 | B1 | * | 2/2001 | Wong | 379/219 |
| 6,292,479 | B1 | * | 9/2001 | Bartholomew et al. | 370/352 |
| 6,295,297 | B1 | * | 9/2001 | Lee | 370/395.61 |

(Continued)

*Primary Examiner*—Alpus H. Hsu
(74) *Attorney, Agent, or Firm*—Barnes & Thornburg LLP

(57) ABSTRACT

A communications network configuration for delivery of multimedia services comprises a packet network to which a plurality of terminal devices are connected, a service provider network for providing multimedia services to the terminal devices, a virtual circuit switched network intermediate the packet and service provider networks, and a gateway distributed over the circuit switched network. The distributed gateway comprises a client application unit interfacing the circuit switched network to said packet network and a virtual channel interface unit interfacing the circuit switched network to the service provider network. The client application unit binds logical channels for a multimedia call to association tags for respective virtual channels of the circuit switched network and forwards said association tags to the virtual interfacing unit. The interfacing unit assigns to the multimedia call one or more virtual channels associated with the association tags and informs the client application unit of channel numbers for the assigned channels to thereby complete set up of the multimedia call.

8 Claims, 2 Drawing Sheets

U.S. PATENT DOCUMENTS 6,339,594 B1 * 1/2002 Civanlar et al. ............ 370/352
6,600,733 B2 * 7/2003 Deng ........................ 370/352
6,738,981 B1 * 5/2004 Tonnby et al. ................ 725/98

* cited by examiner

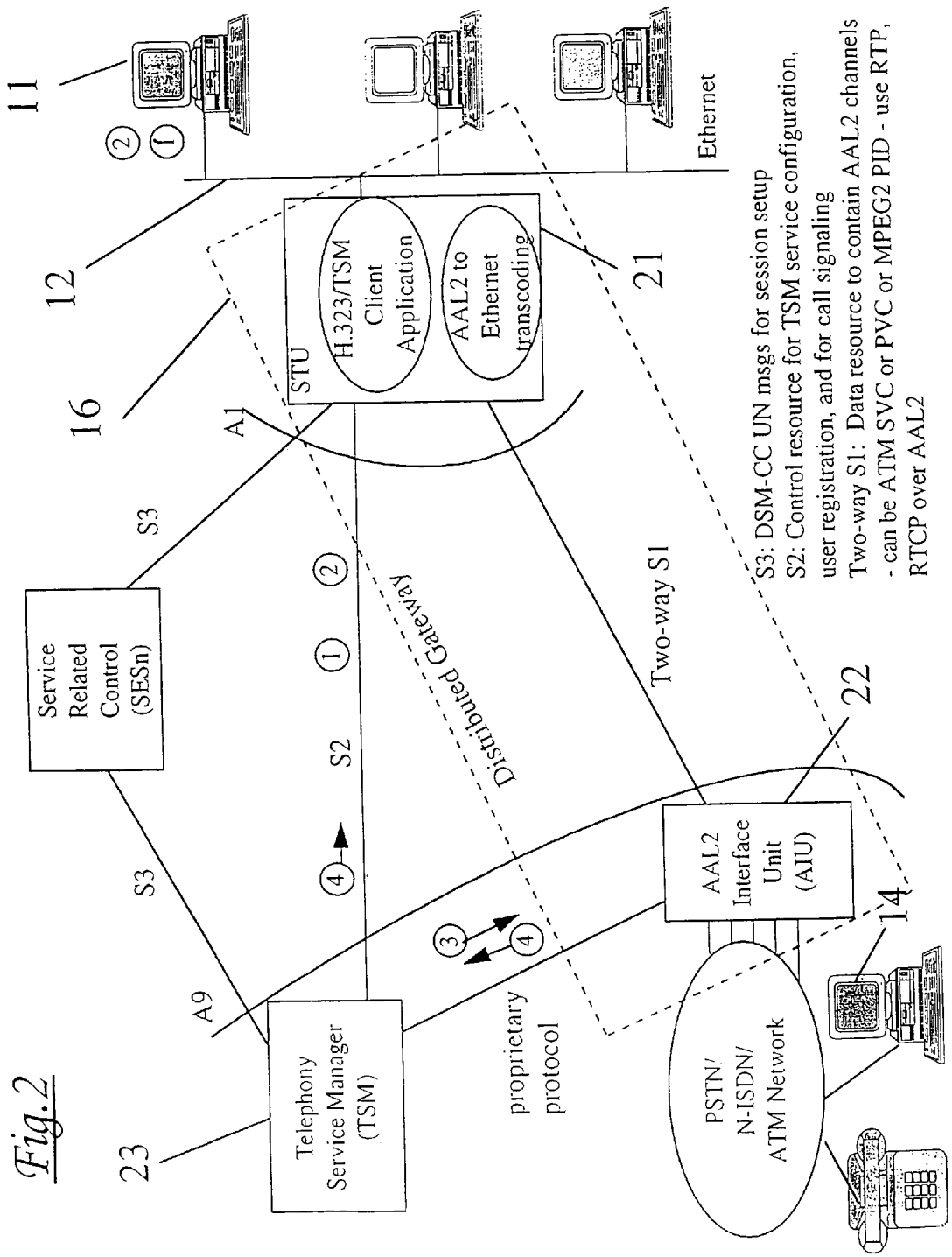

MULTIMEDIA COMMUNICATIONS IN A TELECOMMUNICATIONS NETWORK

This invention relates to telecommunications networks and in particular to a method and arrangement for providing digital audio and visual communication between terminals in such networks via an interface arrangement with a broadband network.

BACKGROUND OF THE INVENTION

A recent introduction in communications technology has been the introduction of network protocols for the delivery of multimedia services to terminals. Typical of these protocols is the so-called Internet (IP) protocol in which information is carried in packets. In these protocols, the services are delivered to terminals over a local area network. The services are generally provided by other networks, e.g. N-ISDN or B-ISDN networks and, as the service providing networks will often be remote from the local area network delivering the services, there is a need for an information transport mechanism to carry traffic between the networks. This problem has been addressed by the development of the Digital Audio-Visual Council (DAVIC) specification 1.1, December 1996, which proposes the use of an asynchronous transfer mode (ATM) network as a transport medium.

A general discussion of multimedia communications in local area networks is given by G A Thom in IEEE Communications Magazine, December 1996, pp 52 to 56. An ATM-UNI-LAN communication method and apparatus is described in specification U.S. Pat. No. 5,528,590.

There is an increasing need to interface local area networks of this type with broad band ATM (asynchronous transfer mode) virtual circuit switched networks to take full advantage of the information traffic handling capabilities of those networks so that services provided by remote networks can be readily accessed.

In such an arrangement, interfaces must be provided both between the local area network and the broadband ATM network and between the ATM network and the service provider network to take account of the different transmission protocols and signalling protocols for the two types of network. The service provider must also take account of the switched virtual circuit nature of the broadband network. These interfaces, which are generally referred to as gateways provide translation between the virtual circuit switched protocol of the ATM network and the packet and circuit switched protocols of the networks interfacing therewith. At present this requires the provision of a number of different gateways with a consequent penalty in terms of cost and complexity.

SUMMARY OF THE INVENTION

An object of the invention is to minimise or to overcome this disadvantage.

A further object of the invention is to provide an improved arrangement and method for the delivery of multimedia services in a distribution network.

A further object of the invention is to provide an improved arrangement and method for accessing a service provider network from a local area network.

According to one aspect of the invention there is provided a communications network configuration comprising a packet network to which a plurality of terminals are connected, a service provider network, a circuit switched network provided intermediate said packet and service provider network, and a distributed gateway providing an interface between said circuit switched network and said service provider and packet networks whereby to effect access of said packet network to services provided by said service provider network.

According to another aspect of the invention there is provided a method of transmitting service traffic in a communications network configuration comprising a packet network to which a plurality of terminals are connected, a service provider network arranged to provide service traffic, a circuit switched network provided intermediate said packet and service provider network, the method including transmitting said service traffic via a distributed gateway providing an interface between said circuit switched network and said service provider and packet networks whereby to effect access of said packet network to services provided by said service provider network.

According to a further aspect of the invention there is provided distributed gateway for a communications network configuration comprising a packet network to which a plurality of terminals are connected, a service provider network, a circuit switched network provided intermediate said packet and service provider network, said distributed gateway incorporating a shared set top unit for said terminals and a network interface unit whereby to effect access of said packet network to services provided by said service provider network.

The distributed gateway effectively provides a transparent coupling between the packet network and the service provider network.

Advantageously, the broadband virtual circuit switched network is an ATM network employing the AAL-2 protocol in which traffic is carried in minicells.

Typically, the local area network conforms to the H323 standard for multimedia communications across IP-based networks.

BRIEF DESCRIPTION OF THE DRAWINGS

An embodiment of the invention will now be described with reference to the accompanying drawings in which:—

FIG. 2 shows a distributed gateway arrangement used in the communications system of FIG. 1.

DESCRIPTION OF PREFERRED EMBODIMENT

Figure 1:
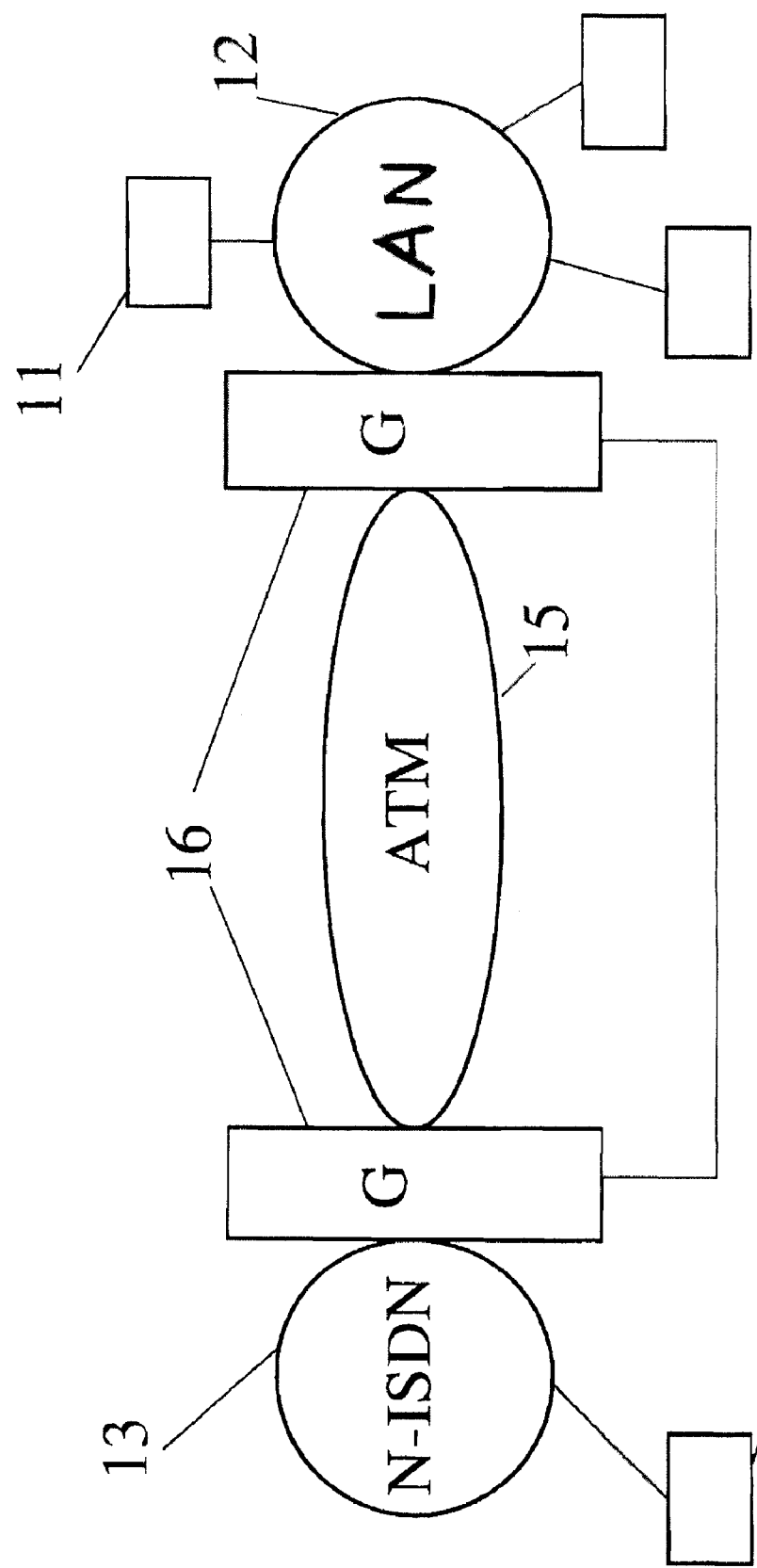
FIG. 1 is a schematic diagram of a multimedia communications system.

Referring first to FIG. 1, this shows in schematic form an arrangement for the delivery of multimedia services to terminals 11 coupled to a local area network (LAN) 12. The LAN 12 is a packet network. The services may be delivered from a number of networks (only one of which is shown) such as a N-ISDN network 13. Communication between one or more LAN terminals 12 and a terminal 14 coupled to the N-ISDN network 13 may be established via a circuit switched network, e.g. an ATM network 15. Interfacing between the circuit switched network 15 and the networks 12 and 13 is provided by a distributed gateway 16. Effectively, the function of the gateway is to set up a transparent link between the LAN 12 and the service provider network 13 such that the LAN is unaware of the existence of the intermediate ATM network 15.

Advantageously the traffic within the ATM network is carried in minicells, e.g. using the AAL-2 (ATM adaptation layer 2) protocol in which traffic from a number of low bit rate users is packaged into minicells which are multiplexed together to form the payloads of ATM cells. This protocol was developed for carrying telephony services but is readily adaptable for handling multimedia traffic.

Referring now to FIG. 2, this illustrates the operation of the distributed gateway of the network of FIG. 1. The gateway will be described below with particular reference to the H.323 protocol for multimedia communications over local area networks, but it will be appreciated that the technique is in no way limited to the use of this particular protocol.

In this configuration, a terminal or PC 11 connected over the packet network or LAN 12 to a shared set-top unit (STU) 21 initiates a multimedia call (audio, video, data) to another terminal or PC 14 at the other side of a network. Note that the PC 11 may also be incorporated directly into the STU 21. The H.323 gateway 16 is distributed over the ATM network so that the gateway functionality is shared between the set top unit (STU) 21 and the AAL2 Interface Unit (AIU) 22. In FIG. 2, the H.323 Gateway is depicted as being distributed over a DAVIC delivery system, but in general the H.323 Gateway could of course be distributed over any ATM network.

As shown in the figure, the distributed gateway comprises the shared STU 21 and the AAL-2 interface unit 22. In some applications it may also incorporate the telephony service manager 23.

The AAL-2 interface unit (AIU) 22 could be a gateway to another H.323 network, to the PSTN (to reach H.324 terminals), or to the N-ISDN network (to reach H.320 terminals).

In FIG. 2, the reference S3 indicates the path of DSM-CC (distributed software manager connection control) messages for session set up. S2 indicates the path for control resource for TSM service configuration, user registration and for call signalling. S1 is a two way path for a data resource to contain AAL-2 channels, and may comprise ATM SVC or PVC, or MPEG2 PID.

In a telephony service and user registration configuration, the Telephony service manager (TSM) 23 may evolve to become an H.323 gatekeeper depending on what protocols are defined for use between the TSM and the STU. If the TS (telephony service) Client Application is downloaded to the STU, it does not matter what protocols are used over the S2 flow. However, if the TS Client Application is not downloaded, then the protocols used must be defined.

In a preferred embodiment, the TSM and the distributed gateway may be used to initiate a multimedia call using the following sequence of operations:—

1. The user asks the H.323 application in the PC terminal 11 in the home to initiate an H.323 call. This begins H.225.0 Q.931 call control signaling to the H.323 TS Client Application, which then initiates signaling over S2 to the TSM to establish the call through the PSTN/N-ISDN/ATM network via the AIU. The protocol for the signaling over the S2 flow may or may not be H.323/H.225.0 based. Since the STU will typically be JAVA based, a JTAPI (JAVA telephony application protocol interface) may be preferred over the H.225.0 Q.931 protocol, for the signalling.

2. The H.323 Application on the user terminal or PC in the home then initiates one or more H.245 Open Logical Channel requests at a specific QoS. These go to the H.323 TS Client Application in the STU. The H.323 Client Application in the STU binds the interface of each logical channel to one association tag for an AAL2 channel, and signals the TSM with the address to call (S2 flow). There would be one AAL2 channel for the audio stream, and one for the video stream, and one for data.

The association tag for the H.245 channel (H.245 logical channel 0) is also forwarded to the TSM to similarly bind its AAL2 connection at the AIU.

Note that the H.245 Open Logical Channel messages could be incorporated or piggybacked within the initial signaling to the TSM.

3. The TSM requests the AIU to allocate the assigned AAL2 channels at the requested QoS (quality of service). The AAL2 channels may be pre-allocated or allocated dynamically.

The AAL2 Negotiation Procedure (ANP) (or a simpler version of this) is used over AAL2 channel 0 to inform the STU the actual AAL2 channel number associated with each association tag.

The AIU initiates ring back until the call is answered, over the assigned AAL2 channel for audio.

The TSM also requests the AIU to make the call over the PSTN/N-ISDN/ATM network, and to use the association tags/AAL2 channels assigned.

4. The AIU places the call and connects it to the AAL2 channels corresponding to the association tags for the H.245 channel, and the audio, video and data channels.

The AIU responds to the TSM with a message confirming that the call has been placed and/or the AAL2 channels have been assigned/allocated, so that the TSM can respond to the TS Client Application process on the STU. Any extra calling information on the called party is sent as well. The STU may forward this to the H.323 terminal. This completes the set up of the multimedia call between the user terminals.

The protocols H.225, H.245, H.320, H.323, H.324 and H.363 above refer to the corresponding ITU-T recommendations.

Although a particular embodiment of the invention has been described, it will be apparent that modifications and variations could be effected by persons skilled in the art without departing from the spirit or scope of the invention which is defined by the appended claims.

The invention claimed is:

1. A communications network configuration for delivery of multimedia services to terminal devices, said communications network configuration comprising a packet network to which a plurality of terminal devices are connected, a service provider network for providing multimedia services to said terminal devices, a virtual circuit switched network provided intermediate said packet and service provider networks, and a gateway distributed over said virtual circuit switched network comprising a client application unit interfacing said virtual circuit switched network to said packet network and a virtual channel interface unit interfacing said virtual circuit switched network to said service provider network, wherein said client application unit is configured to bind one or more logical channels for a multimedia call requested by one of said terminal devices to association tags for respective virtual channels of said virtual circuit switched network and to forward said association tags to said virtual channel interfacing unit, and said virtual channel interfacing unit is configured to assign to said multimedia call one or more virtual channels associated with said association tags and to inform the client application unit of channel numbers for said one or more assigned virtual channels to thereby complete set up of the multimedia call.

2. The network configuration as claimed in claim 1, wherein said virtual circuit switched network comprises an asynchronous transfer mode (ATM) network.

3. The network configuration as claimed in claim 2, wherein said ATM network is adapted to carry traffic in AAL-2 minicells.

4. The network configuration as claimed in claim 2, wherein said virtual channel interfacing unit comprises an AAL-2 interface unit.

5. The network configuration as claimed in claim 4, wherein said distributed gateway further incorporates a telephony service manager for establishing calls between said terminal devices and said service provider network.

6. A method of transmitting service traffic in a communications network for delivery of multimedia services to terminal devices, said communications network comprising a packet network to which a plurality of terminal devices are connected, a service provider network for providing multimedia services to said terminal devices, and a virtual circuit switched network provided intermediate said packet and service provider networks, the method comprising:

transmitting said multimedia service traffic via a gateway distributed over said virtual circuit switched network, said gateway comprising a client application unit interfacing said virtual circuit switched network to said packet network and a virtual channel interface unit interfacing said virtual circuit switched network to said service provider network;

at said client application unit, binding one or more logical channels for a multimedia call requested by one of said terminal devices to association tags for respective virtual channels of said virtual circuit switched network and forwarding said association tags to said virtual channel interfacing unit; and at said virtual channel interfacing unit, assigning to said multimedia call one or more virtual channels associated with said association tags and informing the client application unit of channel numbers for said one or more assigned virtual channels to thereby complete set up of the multimedia call.

7. A distributed gateway for a communications network configuration for delivery of multimedia services to terminal devices, said communications network configuration comprising a packet network to which a plurality of terminal devices are connected, a service provider network for providing multimedia services to said terminal devices, and a virtual circuit switched network provided intermediate said packet and service provider networks, said distributed gateway being distributed over said virtual circuit switched network and comprising a client application unit interfacing said virtual circuit switched network to said packet network and a virtual channel interface unit interfacing said virtual circuit switched network to said service provider network, wherein said client application unit is configured to bind one or more logical channels for a multimedia call requested by one of said terminal devices to association tags for respective virtual channels of said virtual circuit switched network and to forward said association tags to said virtual channel interfacing unit, and said virtual channel interfacing unit is configured to assign to said multimedia call one or more virtual channels associated with said association tags and to inform the client application unit of channel numbers for said one or more assigned virtual channels to thereby complete set up of the multimedia call.

8. distributed gateway as claimed in claim 7, and further incorporating a telephony service manager for establishing calls between said terminal devices and said service provider network.

* * * * *